(12) United States Patent
Ohsaki et al.

(10) Patent No.: US 6,890,684 B2
(45) Date of Patent: *May 10, 2005

(54) METHOD OF BINDING AN ELECTROLYTE ASSEMBLY TO FORM A NON-AQUEOUS ELECTROLYTE SECONDARY BATTERY

(75) Inventors: Takahisa Ohsaki, Kanagawa-ken (JP); Norio Takami, Kanagawa-ken (JP); Hiroyuki Hasebe, Kanagawa-ken (JP); Motoya Kanda, Kanagawa-ken (JP); Asako Sato, Kanagawa-ken (JP); Takashi Kuboki, Tokyo (JP); Shuji Yamada, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 340 days.

This patent is subject to a terminal disclaimer.

(21) Appl. No.: 10/171,645

(22) Filed: Jun. 17, 2002

(65) Prior Publication Data

US 2003/0035995 A1 Feb. 20, 2003

Related U.S. Application Data

(63) Continuation of application No. 09/525,748, filed on Mar. 14, 2000, now Pat. No. 6,423,447.

(30) Foreign Application Priority Data

Mar. 15, 1999 (JP) .......................................... 11-069003

(51) Int. Cl.$^7$ ................................................ H01M 4/62
(52) U.S. Cl. ...................... 429/217; 429/132; 29/623.1; 29/623.4
(58) Field of Search ............................... 429/217, 132, 429/94; 29/623.1, 623.4

(56) References Cited

U.S. PATENT DOCUMENTS

| | | | |
|---|---|---|---|
| 4,172,319 A | * 10/1979 | Bloom et al. | ............... 29/623.4 |
| 4,767,683 A | 8/1988 | Yamada et al. | |
| 4,969,254 A | * 11/1990 | Dahn et al. | ............... 29/623.1 |
| 5,079,109 A | 1/1992 | Takami et al. | |
| 5,272,022 A | 12/1993 | Takami et al. | |
| 5,437,692 A | * 8/1995 | Dasgupta et al. | ............ 29/623.1 |
| 5,498,492 A | 3/1996 | Hara et al. | |
| 5,540,741 A | * 7/1996 | Gozdz et al. | ............... 29/623.5 |
| 5,552,239 A | * 9/1996 | Gozdz et al. | .................. 429/94 |
| 5,556,723 A | 9/1996 | Ohsaki et al. | |
| 5,607,485 A | * 3/1997 | Gozdz et al. | ............... 29/623.5 |
| 5,612,155 A | 3/1997 | Takami et al. | |
| 5,698,147 A | * 12/1997 | Chern et al. | ................. 264/104 |
| 5,753,387 A | 5/1998 | Takami et al. | |
| 5,795,678 A | 8/1998 | Takami et al. | |

(Continued)

Primary Examiner—Mark Ruthkosky
(74) Attorney, Agent, or Firm—Oblon, Spivak, McClelland, Maier & Neustadt, P.C.

(57) ABSTRACT

There is proposed a non-aqueous electrolyte secondary battery having an electrode assembly which is impregnated with a non-aqueous electrolyte solution, wherein the battery can be made thin while maintaining improved capacity, large-current characteristics and cycle life.

The non-aqueous electrolyte secondary battery comprises a positive electrode, a negative electrode, a separator and a non-aqueous electrolyte solution. The production process of the battery comprises steps of preparing an electrode assembly by interposing a separator between a positive electrode and a negative electrode, impregnating the electrode assembly with an organic solvent which can dissolve the binder of the positive- and/or negative electrodes, bonding the positive electrode and the separator together and bonding the negative electrode and the separator together by drying the electrode assembly, and impregnating the electrode assembly with a non-aqueous electrolyte solution.

2 Claims, 6 Drawing Sheets

U.S. PATENT DOCUMENTS

| | | | |
|---|---|---|---|
| 6,024,773 A | * | 2/2000 | Inuzuka et al. ............ 29/623.4 |
| 6,156,457 A | | 12/2000 | Takami et al. |
| 6,342,319 B1 | | 1/2002 | Kuboki et al. |
| 6,350,544 B1 | | 2/2002 | Takami et al. |
| 6,413,679 B1 | | 7/2002 | Kuboki et al. |
| 6,423,447 B1 | | 7/2002 | Ohsaki et al. |
| 6,465,125 B1 | | 10/2002 | Takami et al. |
| 6,468,693 B1 | | 10/2002 | Takami et al. |
| 6,495,291 B1 | | 12/2002 | Kohno et al. |
| 6,503,657 B1 | | 1/2003 | Takami et al. |
| 6,541,157 B1 | | 4/2003 | Inagaki et al. |
| 6,544,682 B1 | | 4/2003 | Takami et al. |
| 6,589,690 B1 | | 7/2003 | Sato et al. |
| 6,623,889 B2 | | 9/2003 | Morita et al. |
| 6,686,090 B2 | | 2/2004 | Inagaki et al. |
| 6,686,095 B2 | | 2/2004 | Hayase et al. |
| 6,696,197 B2 | | 2/2004 | Inagaki et al. |

* cited by examiner

METHOD OF BINDING AN ELECTROLYTE ASSEMBLY TO FORM A NON-AQUEOUS ELECTROLYTE SECONDARY BATTERY

This application is a continuation of U.S. application Ser. No. 09/525,748 Mar. 14, 2000, now U.S. Pat. No. 6,423,447.

BACKGROUND OF THE INVENTION

1. Field of the Invention

The present invention relates to a non-aqueous electrolyte secondary battery, more particularly to a non-aqueous electrolyte secondary battery which is most suitable for a thin type lithium-ion secondary battery, and the method of production thereof.

2. Description of the Related Art

Thin type lithium-ion secondary batteries have been commercialized as non-aqueous electrolyte secondary batteries for portable equipment such as cellular phones. This type of battery comprises a positive electrode made of lithium cobalt oxide ($LiCoO_2$), a negative electrode made of graphitic and carbonaceous materials, an electrolyte solution prepared by dissolving a lithium salt in an organic solvent, and a separator made of a porous film.

Since the portable equipment is becoming increasingly thinner, it is a general requirement to reduce the thickness of batteries. However, it is difficult to produce thin type lithium-ion secondary batteries having a thickness of 4 mm or less. For this reason, card-type lithium secondary batteries having a polymer electrolyte have been proposed, and development for their commercialization has been in progress.

In lithium secondary batteries having a polymer electrolyte, a gel polymer holding a non-aqueous electrolyte solution is usually employed. Consequently, these batteries have larger impedance at the electrode interface and lower lithium-ion conductivity than non-aqueous electrolyte lithium secondary batteries. Further, when the positive- and negative electrodes of the lithium secondary batteries having a polymer electrolyte are made thinner in order to enhance lithium ion conductivity, the amount of the active material of the positive- and negative electrodes is reduced, thereby reducing the energy density.

Thus the lithium secondary batteries provided with a polymer electrolyte have a problem that they are inferior in volumetric energy density and large-current characteristics to thin type lithium secondary batteries which is impregnated with a non-aqueous electrolyte solution in a liquid state.

Japanese Patent Disclosure (Kokai) No. 10-177865 describes a lithium ion secondary battery which comprises a positive electrode, a negative electrode, a separator holding an electrolyte solution and having surfaces facing the positive electrode and the negative electrode, and adhesive resin layers disposed on the surfaces of the separator, which adhesive resin layers comprise a mixed phase of an electrolyte solution phase, a polymer gel phase containing an electrolyte solution and a solid polymer phase, said adhesive resin layers joining the positive- and negative electrodes with the adjacent surfaces of the separator. A claim of Japanese Patent Disclosure (Kokai) No. 10-189054 describes a method of producing a lithium ion secondary battery which comprises processes of forming positive- and negative electrodes on corresponding current collectors, coating a separator with a binder resin solution in which polyvinylidene fluoride is dissolved as a main component, forming a battery laminate by stacking the electrodes on the separator and drying the closely contacted electrodes and separator to vaporize the solvent, and impregnating the laminate with an electrolyte solution.

In these lithium ion secondary batteries, however, adhesive resin layers are interposed between the positive electrode and the separator and between the negative electrode and the separator. Consequently, these lithium ion secondary batteries have increased internal resistance, and inferior cycle life and large-current discharge characteristics.

SUMMARY OF THE INVENTION

The present invention relates to a non-aqueous electrolyte secondary battery and the production method thereof. More specifically, the non-aqueous electrolyte secondary battery of the present invention has an electrode assembly into which non-aqueous electrolyte is impregnated as a solution, wherein not only the thickness of the battery can be reduced by a simple means but also capacity, large-current characteristics and cycle life can be improved.

According to an aspect of the present invention, there is provided a production process of a non-aqueous electrolyte secondary battery which is equipped with;

a positive electrode including a positive electrode active material and a binder as its constituents;

a negative electrode including a negative electrode active material and a binder as its constituents;

a separator interposed between the positive electrode and the negative electrode; and a non-aqueous electrolyte solution;

wherein the above production process comprises steps of;

preparing an electrode assembly by interposing a separator between a positive electrode and a negative electrode;

impregnating the electrode assembly with an organic solvent which can dissolve the binder of the positive and/or negative electrodes;

bonding the positive electrode and the separator together and bonding the negative electrode and the separator together by drying the electrode assembly; and impregnating the electrode assembly with a non-aqueous electrolyte solution.

Further, the non-aqueous electrolyte secondary battery according to the present invention comprises;

an electrode assembly consisting of a positive electrode, a negative electrode, and a separator; and a non-aqueous electrolyte solution;

wherein a binder is contained obeying a specific distribution in at least part of each constituent layer of the electrode assembly consisting of a laminate of a positive electrode, a separator and a negative electrode, the distribution of the binder having a concentration gradient such that the binder concentration measured in the cross-sectional direction of the electrode assembly has a minimum at the center of the separator and becomes greater toward the interfaces between the positive- and negative electrodes and the separator, thereby forming a U-shaped distribution.

We explain first invention as follows. The first invention is a method for manufacturing a non-aqueous electrolyte secondary battery including an electrode assembly that include a separator between a positive electrode having a first binder material and a negative electrode having a second binder material comprising;

a step of impregnating said electrode assembly with an organic solvent to dissolve at least of said first and second binders, a step of drying said electrode assembly for bonding said positive electrode and said separator and for bonding said negative electrode and said separator together.

We explain second invention as follows. The second invention is a non-aqueous electrolyte secondary battery comprising;

a positive electrode including a positive electrode active material, conductive material and a first binder, a negative electrode including a carbonaceous material which adsorbs or desorbs lithium ions and a second binder, a separator interposed between the positive electrode and the negative electrode, and a non-aqueous electrolyte solution, wherein a concentration gradient of the sum of the first and second binders is a continuous curve such that the binder concentration has a minimum at the center of the separator, becomes gradually greater toward the interfaces between the position electrode and the negative electrode and is saturated to the maximum at the centers of the negative electrode and the positive electrode.

We explain third invention as follows. The third invention is a non-aqueous electrolyte secondary battery comprising;

an electrode assembly including of a positive electrode, a separator and a negative electrode; and a non-aqueous electrolyte solution;

wherein a binder is contained, obeying a concentration distribution, in at least part of each the positive electrode, the separator and the negative electrode, the concentration distribution of said binder having a concentration gradient such that the binder concentration measured in the cross-sectional direction of said electrode assembly has a minimum at the center of said separator and becomes greater toward the interfaces between said positive electrode and said separator and between said negative electrodes and said separator, thereby forming a U-shaped distribution.

DETAILED DESCRIPTION OF THE PREFERRED EMBODIMENTS

The present invention will be further explained in detail with reference to FIGS. 1, 2, 3, 4 and 5.

Figure 1:
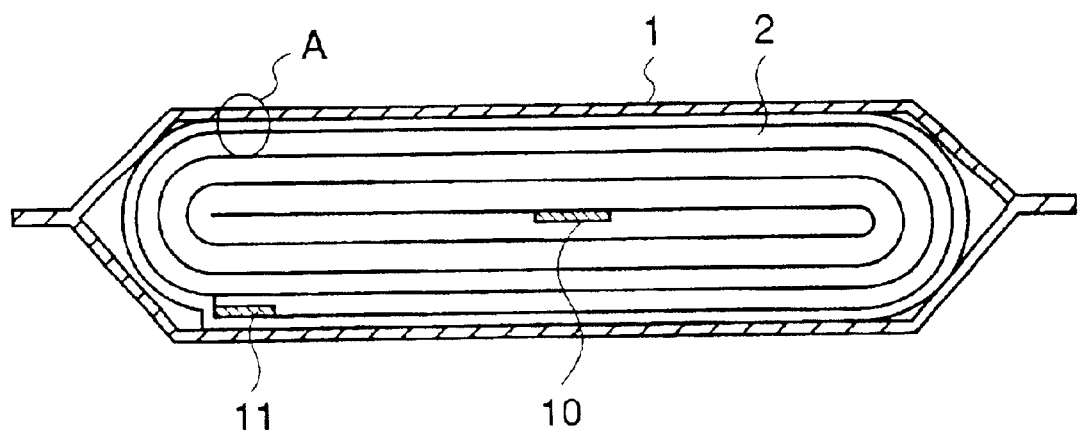
FIG. 1 is a cross-sectional view showing one embodiment of a non-aqueous electrolyte secondary battery according to the present invention.
Figure 2:
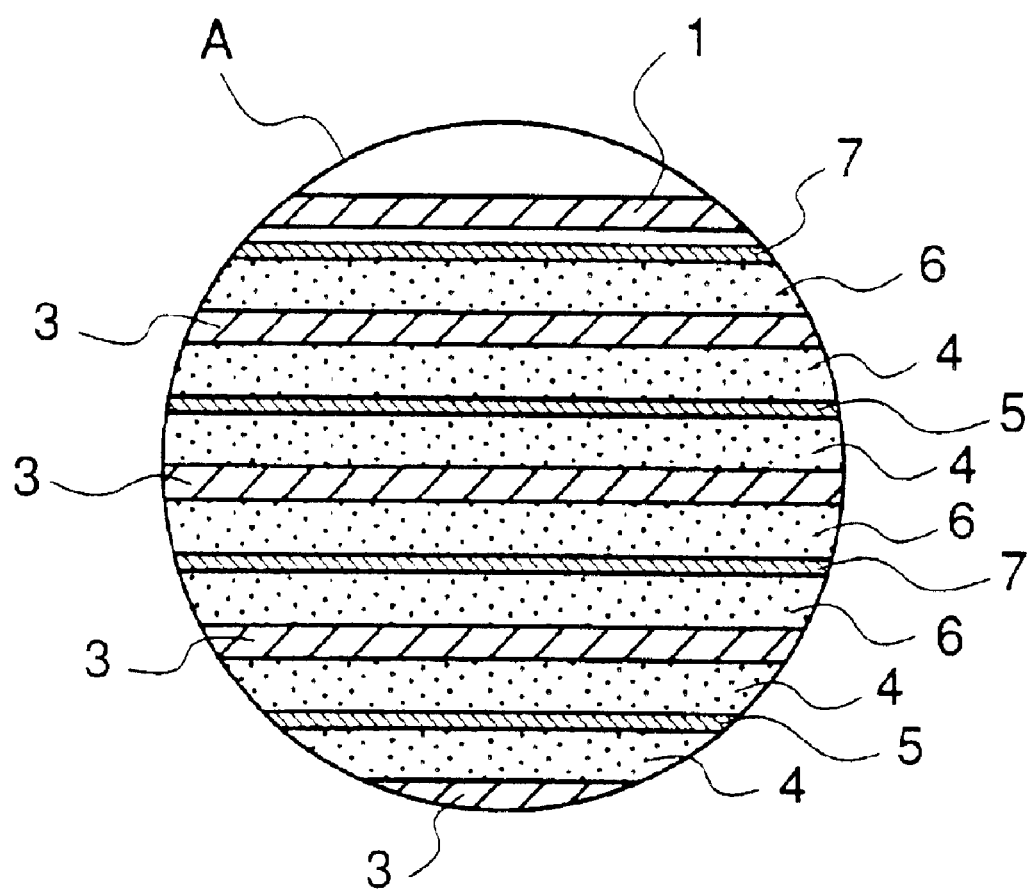
FIG. 2 is an enlarged view of part A of FIG. 1.
Figure 3:
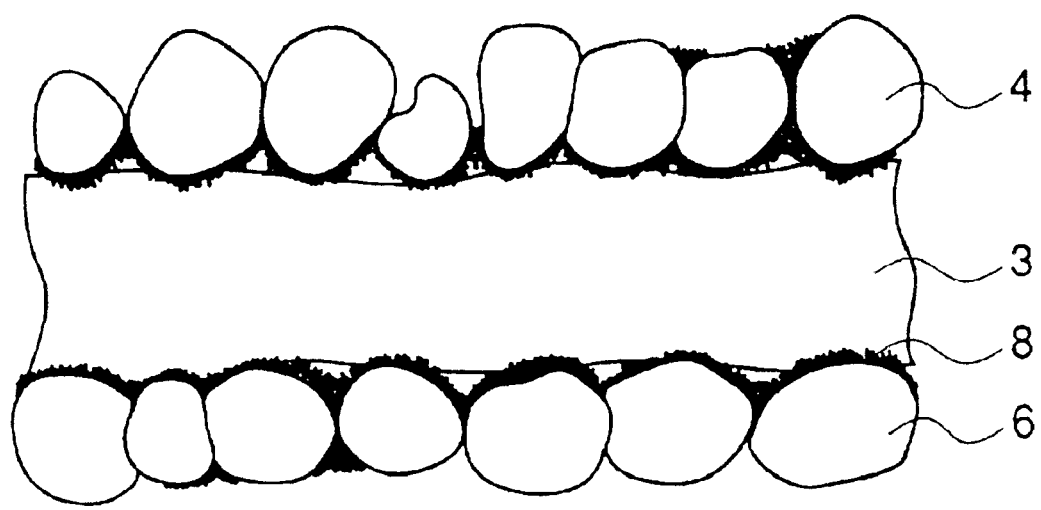
FIG. 3 is a schematic diagram showing the vicinity of the interfaces between the positive electrode layer, the separator and the negative electrode layer of the non-aqueous electrolyte secondary battery shown in FIG. 1.

FIG. 1 shows a cross-sectional view of a non-aqueous electrolyte secondary battery (e.g. a thin type lithium ion secondary battery) according to the present invention. FIG. 2 shows an enlarged view of part A of FIG. 1. FIG. 3 is a schematic diagram of the vicinity of the interfaces between the positive electrode layer, the separator and the negative electrode layer.

Figure 4:
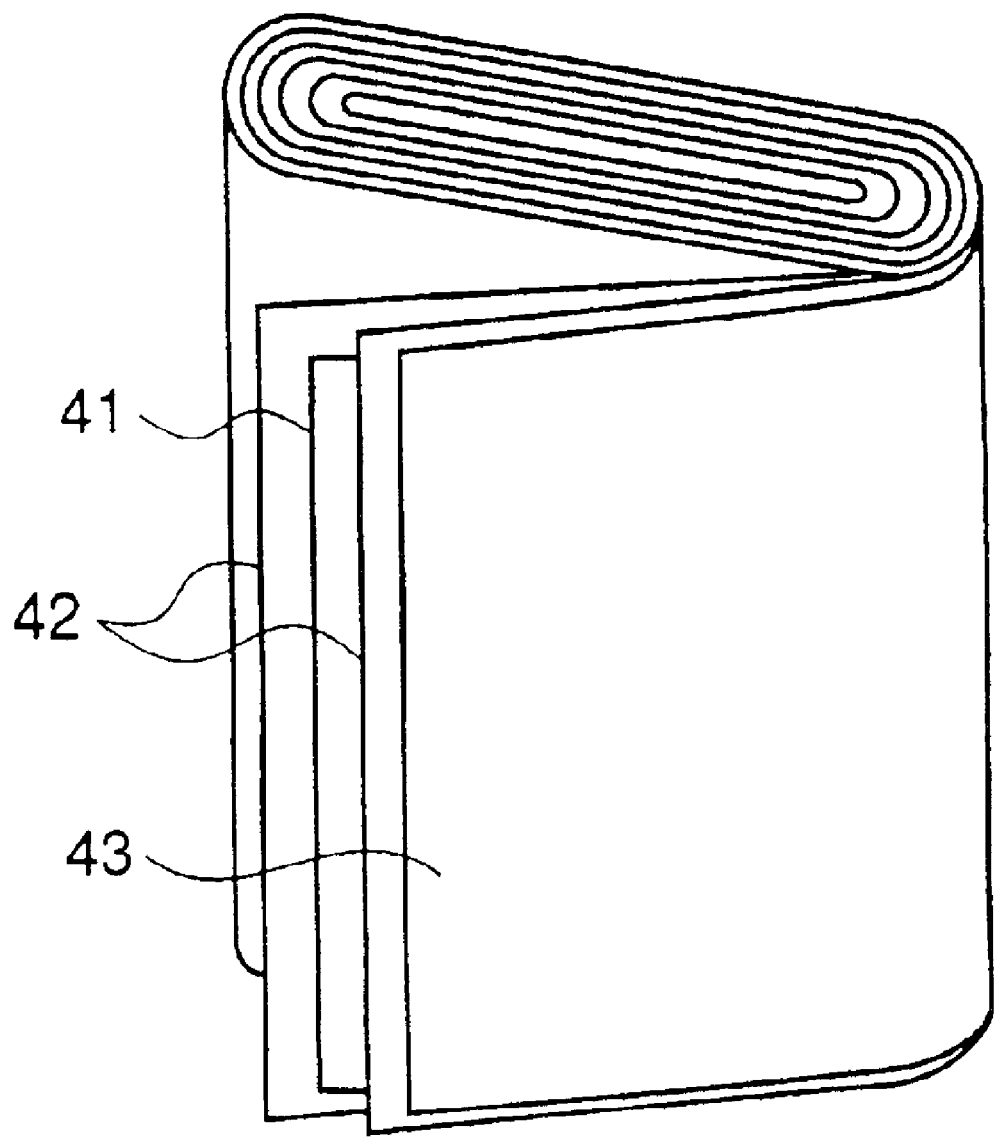
FIG. 4 is an oblique view showing a non-aqueous electrolyte secondary battery having a body which is formed by winding up a positive electrode, a negative electrode and a separator.

FIG. 4 shows an oblique view of a non-aqueous electrolyte secondary battery having a body which is formed by winding up a positive electrode, a negative electrode and a separator.

Figure 5:
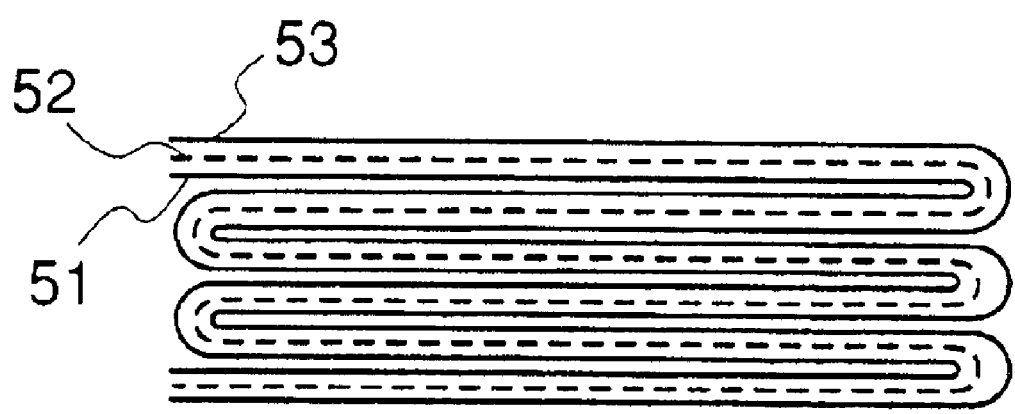
FIG. 5 is an oblique view showing a non-aqueous electrolyte secondary battery having a body which is formed by winding up or folding a positive electrode, negative electrode and separator.

FIG. 5 shows an oblique view of a non-aqueous electrolyte secondary battery having a body which is formed by winding up or folding a positive electrode, a negative electrode and a separator.

As shown in FIG. 1, a jacket made of a laminated film 1 accommodates an electrode assembly 2. The electrode assembly 2 is composed of a body of a laminate of a positive electrode, a separator and a negative electrode, which body is formed by winding up the laminate in a flat shape. As shown in FIG. 2, the laminate has a separator 3, a positive electrode layer 4, a positive electrode current collector 5, a positive electrode layer 4, a separator 3, a negative electrode layer 6, a negative electrode current collector 7, a negative electrode layer 6, a separator 3, a positive electrode layer 4, a positive electrode current collector 5, a positive electrode layer 4, a separator 3, a negative electrode layer 6 and a negative electrode current collector 7, all stacked in this order. The negative electrode current collector 7 constitutes the outermost layer of the electrode assembly 2.

As shown in FIG. 3, over the entire electrode assembly 2, part of the binder of the positive electrode and/or negative electrode is supported as adhesive layers 8 on at least part of the voids of the positive electrode layer 4, the separator 3 and the negative electrode layer 6, particularly on the interface between the positive electrode layer 4 and the separator 3, and on the interface of the negative electrode layer 6 and the separator 3. These adhesive layers 8 are formed by the following process. After constructing the electrode assembly 2, part of the binder of the positive- and/or negative electrodes is dissolved by impregnating the electrode assembly with an organic solvent which is capable of dissolving the above-mentioned binder. The dissolved binder then permeates into the voids of the electrode assembly 2, particularly into the interfaces between the positive electrode layer 4 and the separator 3 and between the negative electrode layer 6 and the separator 3, where the binder finally reprecipitates on drying of the electrode assembly, thereby forming the adhesive layers. By the above process, firm adhesion is realized between the positive electrode and the separator and between the negative electrode and the separator, and the whole electrode assembly is integrated into a single body. A non-aqueous electrolyte solution is impregnated into the electrode assembly 2 inside the jacket 1. One end of a positive electrode lead strip 10 is connected to the positive electrode current collector 5 of the electrode assembly 2 and the other end thereof penetrates the jacket 1 to the outside, while a negative electrode lead strip 11 is connected to the current collector of the negative electrode 7 of the electrode assembly 2 and the other end thereof penetrates the jacket 1 and extends to the outside.

In one preferred embodiment of the present invention which is not shown as a figure, it is preferable that the binder is distributed ununiformly or in patches in the plane of the interfaces between the positive electrode and the separator and between the negative electrode and the separator in order to enhance bonding strength and reduce the inner resistance of the battery.

The non-aqueous electrolyte secondary battery provided by the production method of the present invention may have an electrode assembly which is formed by winding up a laminate of a positive electrode 41, a negative electrode 43 and a separator 42 as shown in FIG. 4, or an electrode assembly formed by folding a laminate of a positive electrode 51, a negative electrode 53 and a separator 52, as shown in FIG. 5. By adopting these structures, the electrode assembly can be easily produced and have large mechanical strength. Preferably, the area of the negative electrode 43 is larger than the area of the positive electrode 41. By adopting this structure, in which the end of the negative electrode protrudes over the positive electrode, the current concentration at the end of the negative electrode is suppressed, and the cycle life and safety of the battery are improved.

Further, it is preferable that the shorter side of the separator is protruding over the shorter side of the electrode strip of the negative electrode by a length of 0.25 mm to 4 mm. By adopting this structure, the short circuit between the positive- and negative electrodes is prevented even when the battery suffers mechanical impacts. Further, even when part of the separator shrinks at high temperatures of over 100.degree. C., the short circuit between the positive- and negative electrodes is prevented, thereby enhancing the safety of the battery.

Figure 6:
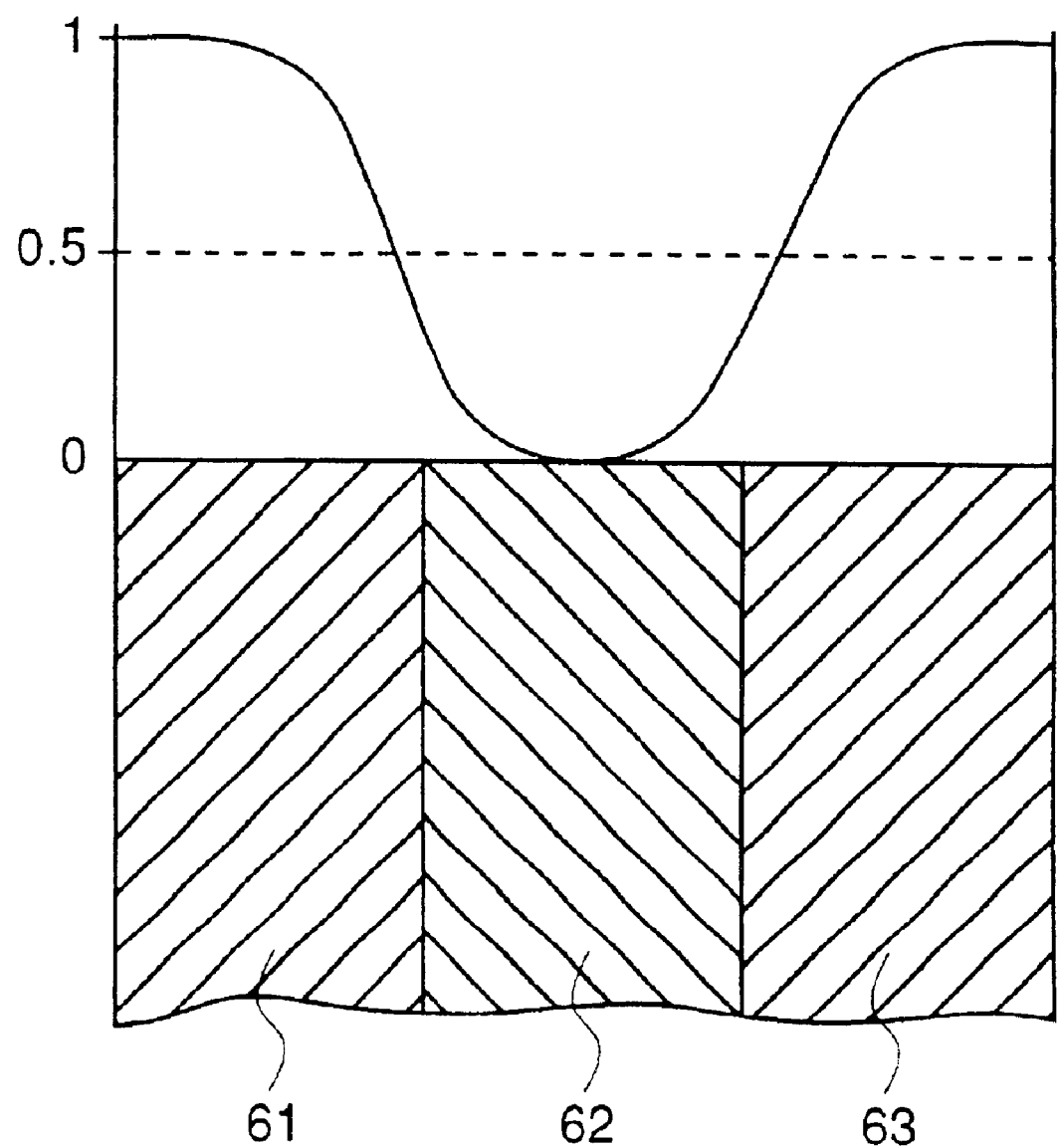
FIG. 6 is a cross-sectional view showing the concentration gradient of a binder in each of the laminated constituent layers of an electrode assembly.

FIG. 6 shows a cross-sectional view showing the concentration gradient of a binder in each of the laminated constituent layers of an electrode assembly consisting of a positive electrode 61, a separator 62 and a negative electrode 63. This positive electrode 61 have first binders. This negative electrode 63 have second binders. In FIG. 6 the binder is showed the sum of the first and second binders. In the electrode assembly of the present invention shown in FIG. 6, a binder is contained obeying a specific distribution in at least part of each constituent layer of the electrode assembly consisting of a laminate of the positive electrode 61, the separator 62 and the negative electrode 63, the distribution of the binder having a concentration gradient such that the binder concentration measured in the cross-sectional direction of the electrode assembly has a minimum at the center of the separator 61 and becomes greater toward the interfaces between the positive electrode 61 and the separator 62 and between the negative electrode 63 and the separator 62, thereby forming a U-shaped distribution. Further, in this distribution of the binder, the binder concentration at the interfaces between the positive electrode 61 and the separator 62 and between the negative electrode 63 and the separator 62 is smaller than half the maximum binder concentration in the positive electrode 61 and in the negative electrode 63, as shown in the figure.

In FIG. 6, a concentration gradient of the sum of the first and second binders is a continuous curve such that the binder concentration has a minimum at the center of the separator, becomes gradually greater toward the interfaces between the position electrode and the negative electrode and is saturated to the maximum at the centers of the negative electrode and the positive electrode. In FIG. 6, the maximum binder concentration is arbitrarily assumed to be 1.0 and the half of the maximum to be 0.5.

By virtue of the above-mentioned concentration gradient, the hardened adhesive binder joins the adjacent constituent layers firmly at their interfaces, thus making continuous, separate adhesive layers at the interfaces, which have been indispensable in the conventional technique, unnecessary. Consequently, not only the total layer thickness but also the resistance at the interfaces can be minimized. Thus the realization of the concentration gradient of the binder mentioned above brings about a multiple effect of achieving larger bonding strength, smaller thickness and smaller resistance simultaneously.

In the following, the positive electrode, the negative electrode, the separator 3, the adhesive layer 8, the non-aqueous electrolyte solution and the jacket 1 are described in detail.

1) The Positive Electrode

The positive electrode has a structure in which a positive electrode layer 4 containing an active material is supported on a single or both sides of a current collector 5.

The positive electrode layer usually comprises a positive electrode active material, a binder and a conductive material.

The positive electrode active material is selected from a group of various oxides, for example manganese dioxide, lithium-manganese composite oxides, lithium-containing nickel oxides, lithium-containing cobalt oxides, lithium-containing nickel-cobalt oxides, lithium-containing iron oxides, and lithium-containing vanadium oxides The positive electrode active material can also be selected from a group of chalcogenides, for example titanium disulfide and molybdenum disulfide. Particularly preferred materials among the above materials are cobalt oxides containing lithium (e.g., $LiCoO_2$), lithium-containing nickel-cobalt oxides (e.g., $LiNi_{0.8}Co_{0.2}O_2$), and lithium-manganese composite oxides (e.g., $LiMn_2O_4$, $LiMnO_2$), because high output voltage is obtained when these oxides are used.

Examples of the conductive material are acetylene black, carbon black and graphite.

Examples of the binder are fluoro rubber (FR), polyvinylidene fluoride (PVdF), polyacrylonitrile (PAN), polyvinyl chloride (PVC), ethylene-propylene-diene copolymer (EPDM), and styrene-butadiene rubber (SBR). Among them, FR, PVdF, PAN and SBR are preferred.

The preferred mixing ratio of the positive electrode active material, the conductive material and the binder is in a range of 80 to 95 wt % of the positive electrode active material, 3 to 20 wt % of the conductive material and 2 to 7 wt % of the binder.

For the current collector, a porous conductive substrate or a non-porous conductive substrate can be used. These conductive substrates can be prepared, for example, from aluminum, stainless steel or titanium.

A preferable conductive substrate has a two-dimensional porous structure in which one or more pores of a diameter of 3 mm or less exist per 10 $cm^2$. When the diameter of pores exceeds 3 mm, the strength of the positive electrode may become insufficient. On the other hand, when less than one pore of a diameter smaller than 3 mm exists per 10 $cm^2$, it may become difficult to impregnate the electrode assembly with a non-aqueous electrolyte solution homogeneously, thereby causing the reduction of the cycle life. The preferred pore diameter is in a range of 0.1 to 1 mm. Further, it is preferred that 10 to 20 pores exist per 10 $cm^2$.

The thickness of the above-mentioned conductive substrate in which one or more pore of a diameter of 3 mm or less exist per 10 $cm^2$ is preferably in a range of 10 to 100 .mu.m. When the thickness is smaller than 10 .mu.m, the strength of the positive electrode may become insufficient. On the other hand, when the thickness exceeds 100 .mu.m, the weight of the battery and the thickness of the electrode assembly increase, thus making it difficult to sufficiently enhance energy density per unit weight and energy density per unit volume of the resultant thin type secondary battery. The most preferable range of the thickness is 15 to 80 .mu.m.

2) The Negative Electrode

The negative electrode has a structure in which a negative electrode layer 6 is supported on a single or both sides of a current collector 7.

The negative electrode layer usually comprises a carbonaceous material which adsorbs or desorbs lithium ions and a binder which combines the negative electrode material.

Examples of the carbonaceous material are graphitic or carbonaceous substances such as graphite, coke, carbon fiber and spherical carbon; and graphitic or carbonaceous substances which are obtained by heat-treatment of thermosetting resin, isotropic pitch, mesophase pitch, mesophase pitch carbon fiber, small mesophase spherical particles, of which mesophase pitch carbon fiber is particularly preferable, at 500 to 3,000.degree. C. In particular, graphitic substances which are obtained by raising the above heat-treatment temperature to 2,000.degree. C. or above and have the crystal structure of graphite having a (002) lattice spacing d.sub.002 of 0.340 nm or less are most preferred. A non-aqueous electrolyte secondary battery equipped with a negative electrode containing the above graphitic substances as the carbonaceous material shows greatly improved battery capacity and large-current characteristics. It is more preferable that the lattice spacing d.sub.002 is 0.336 nm or less.

Examples of the binder are fluoro rubber (FR), polyvinylidene fluoride (PVdF), polyacrylonitrile (PAN), polyvinyl chloride (PVC), ethylene-propylene-diene copolymer (EPDM), styrene-butadiene rubber (SBR) and carboxymethylcellulose (CMC). Among them, FR, PVdF, PAN and SBR are preferred.

The mixing ratio of the carbonaceous material and the binder is preferably in a range of 90 to 98 wt % of the carbonaceous material and 2 to 20 wt % of the binder. A more preferable weight of the carbonaceous material on a single surface of the completed negative electrode is in a range of 5 to 20 g/m.sup.2 in the completed negative electrode.

For the current collector, a porous conductive substrate or a non-porous conductive substrate can be used. These conductive substrates can be prepared, for example, from copper, stainless steel, nickel or titanium.

It is preferable to use a conductive substrate having a two-dimensional porous structure in which one or more pores of a diameter of 3 mm or less exist per 10 cm.sup.2. When the diameter of pores exceeds 3 mm, the strength of the negative electrode may become insufficient. On the other hand, when less than one pore of a diameter of 3 mm or less exists per 10 cm.sup.2, it may become difficult to impregnate the electrode assembly with a non-aqueous electrolyte solution homogeneously, thereby causing the reduction of the cycle life. The preferred pore diameter is in a range of 0.1 to 1 mm. Further, it is preferred that 10 to 20 pores exist per 10 cm.sup.2.

The thickness of the above-mentioned conductive substrate in which one or more pore of a diameter of 3 mm or less exist per 10 cm.sup.2 is preferably in a range of 10 to 50 .mu.m. When the thickness is smaller than 10 .mu.m, the strength of the negative electrode will become insufficient. On the other hand, when the thickness exceeds 50 .mu.m, the weight of the battery and the thickness of the electrode assembly increase, thus making it difficult to sufficiently enhance energy density per unit weight and energy density per unit volume of the resultant thin type secondary battery.

The negative electrode may consist of the above-mentioned carbonaceous material which adsorbs or desorbs lithium ions; or of a material selected from a group of metal oxides, metal sulfides, metal nitrides, lithium metal and lithium alloys.

Examples of the metal oxides are tin oxides, silicon oxides, lithium titanium oxides, niobium oxides and tungsten oxides.

Examples of the metal sulfides are tin sulfides and titanium sulfides.

Examples of the metal nitrides are lithium cobalt nitrides, lithium iron nitrides and lithium manganese nitrides.

Examples of the lithium alloys are lithium aluminum alloys, lithium tin alloys, lithium lead alloys and lithium silicon alloys.

3) The Separator

The separator is formed of a porous sheet supporting adhesive polymer in its voids.

For the porous sheet, a porous film or a nonwoven fabric of a synthetic resin containing, for example, polyethylene, polypropylene or PVdF may be employed. In particular, a porous film made of polyethylene or polypropylene or a mixture thereof are most preferable for improving the safety of the secondary battery.

The preferred thickness of the porous sheet is 50 .mu.m or less. When the thickness exceeds 50 .mu.m, the distance between the positive- and negative electrodes increases, thereby making the internal resistance greater. On the other hand, the preferred minimum thickness of the porous sheet is 5 .mu.m. When the thickness is made less than 5 .mu.m, the strength of the separator is drastically reduced, thereby making internal short-circuits occur easily. The more preferable maximum thickness is 30 .mu.m and the minimum thickness is 10 .mu.m.

It is preferable that the thermal shrinkage of the porous sheet by heating at 120.degree. C. for one hour is 20% or less. If the thermal shrinkage is greater than 20%, it may become difficult to obtain sufficient bonding strength between the positive electrode, the negative electrode and the separator. More preferably, the thermal shrinkage is 15% or less.

It is preferable that the porosity of the porous sheet is in a range of 30 to 60%. The reason is as follows. When the porosity is made less than 30%, it may become difficult to hold a sufficient amount of electrolyte solution. On the other hand, when the porosity exceeds 60%, it may become difficult to obtain sufficient separator strength. The preferable range of the porosity is between 35 and 50%.

It is preferable that the air permeability of the porous sheet is 600 sec/100 cm.sup.3 or less. When the air permeability exceeds 600 sec/100 cm.sup.3, it may become difficult to obtain high lithium-ion mobility. The minimum value of the air permeability is preferably 100 sec/100 cm.sup.3. When the air permeability is less than 100 sec/100 cm.sup.3, the separator strength may become insufficient. The maximum value of the air permeability is preferably 500 sec/100 cm.sup.3, and the minimum value thereof is preferably 150 sec/100 cm.sup.3.

4) Non-aqueous Electrolyte Solution

The non-aqueous electrolyte solution is a liquid electrolyte solution prepared by dissolving an electrolyte in a non-aqueous solvent.

For the non-aqueous solvent, various conventional non-aqueous solvents for the lithium secondary battery can be used. Examples of such non-aqueous solvents include, but are not limited to, non-aqueous solvents which consist mainly of a mixture of propylene carbonate (PC) or ethylene carbonate (EC) and one or more non-aqueous solvents which have lower viscosity than the viscosities of PC and EC and have a donor number smaller than 18 (hereafter called the second solvents).

Preferable examples of the second solvents are chain carbonates, particularly dimethylcarbonate (DMC), methylethylcarbonate (MEC), diethylcarbonate (DEC), ethyl propionate, methyl propionate, .gamma.-butyrolactone (BL), acetonitrile (AN), ethyl acetate (EA), toluene, xylene and methyl acetate (MA). These second solvents may be used alone or as a mixture of two or more of them. The donor number of the second solvents is preferably 16.5 or less.

The viscosity of the second solvents is preferably 28 mp or less at 25.degree. C. The mixing ratio of ethylene carbonate or propylene carbonate in the above-mentioned mixed solvents is preferably in a range of 10 to 80% by volume. A more preferable mixing ratio of ethylene carbonate or propylene carbonate is in a range of 20 to 75% by volume.

More preferable compositions of the mixed solvents are mixtures consisting of EC and MEC; EC, PC and MEC; EC, MEC and DEC; EC, MEC and DMC; or EC, MEC, PC and EDC. In all these mixtures, the content of MEC is preferably in a range of 30 to 80% by volume. A more preferable content of MEC is in a range of 40 to 70% by volume.

The other preferable compositions of the mixed solvents are mixtures consisting of EC and BL; PC and BL; EC, PC and BL; EC, BL and DEC; or EC, BL, and MEC. In all these mixtures, the content of MEC or DEC is preferably in a range of 0.5 to 20% by volume.

Examples of the electrolyte to be contained in the above-mentioned non-aqueous electrolyte solutions are lithium salts (electrolytes) such as lithium perchlorate ($LiClO_4$), lithium hexafluorophosphate ($LiPF_6$), lithium tetrafluoroborate ($LiBF_4$), lithium hexafluroarsenate ($LiAsF_6$), lithium trifluoromethanesulfonate ($LiCF_3SO_3$), lithium bistrifluoromethylsulfonylimide [$LiN(CF_3SO_2)_2$]. Among them, $LiPF_6$ and $LiBF_4$ are most preferred.

The concentration of the above-mentioned electrolyte in the non-aqueous solvent is preferably in a range of 0.5 to 2.0 mol/l.

The amount of the non-aqueous electrolyte solution is preferably in a range of 0.2 to 0.6 g per a battery unit capacity of 100 mAh. The reason is as follows. When the amount of the non-aqueous electrolyte solution is less than 0.2 g/100 mAh, the ion conductivity of the positive- and negative electrodes may not be maintained at a sufficient level. On the other hand, when the amount of the non-aqueous electrolyte solution is greater than 0.6 g/100 mAh, the volume of the electrolyte solution becomes excessively large, thereby making it difficult to seal the electrolyte solution by the jacket made of a film. The more preferable amount of the non-aqueous electrolyte solution is in a range of 0.4 to 0.55 g/100 mAh.

5) Adhesive Layer 8

The adhesive layers 8 exist on the interface between the positive electrode layer and the separator and on the interface between the negative electrode layer and the separator, thereby integrating the electrode assembly into a single body.

The adhesive layers originate from part of the binder of the positive electrode and/or the negative electrode, and are formed by the following process. After constructing the electrode assembly 2, part of the binder is dissolved by impregnation of the electrode assembly with an organic solvent which is capable of dissolving the binder of the positive- and negative electrodes. The dissolved binder then permeates into the voids of the interfaces between the positive electrode layer 4 and the separator 3 and between the negative electrode layer 6 and the separator 3, where the binder finally reprecipitates on drying of the electrode assembly, thereby forming the adhesive layers. By this process, firm adhesion is achieved between the positive electrode and the separator and between the negative electrode and the separator, and the whole electrode assembly is integrated to a single body.

The adhesive layers may have a porous structure. Porous adhesive layers can hold a non-aqueous electrolyte solution within their voids.

6) Jacket 1

The jacket 1 may be made, for example, of flexible films made of synthetic resin or metal. In particular, a multilayer laminate of synthetic resin films between which a barrier layer made, for example, of an aluminum film is inserted is preferable for non-aqueous electrolyte secondary batteries, since the barrier layer made of such material as aluminum prevents the contamination of water into the electrolyte, thereby making it possible to make the battery life longer.

The thickness of the jacket is preferably in a range of 50 to 300 .mu.m. When the jacket is too thin, the deformation or destruction of the jacket may result. When the jacket is too thick, the total thickness of the battery cannot be made sufficiently thin.

The manufacturing process of the non-aqueous electrolyte secondary battery according to the present invention is described in the following.

(The First Step)

An electrode assembly is prepared by interposing a separator made of a porous sheet between a positive electrode and a negative electrode.

The positive electrode is prepared, for example, by suspending a positive electrode active material, a conductive material and a binder in an appropriate solvent, coating the resultant suspension on a current collector, drying the coated current collector, and forming the coated current collector to a thin plate. For the active material, conductive material, binder and current collector of the positive electrode, materials listed in the paragraph of the positive electrode 1) can be used.

The negative electrode is prepared, for example, by kneading a mixture of a carbonaceous material which adsorbs or desorbs lithium ions and a binder in the presence of a solvent, coating the suspension thus obtained on a current collector, drying the resultant current collector, and pressing the resultant plate once or several times.

For the carbonaceous material, binder and current collector, materials listed in the paragraph of the negative electrode 2) can be used.

(The Second Step)

The prepared electrode assembly is placed in a bag-shaped film jacket so that the cross section of the electrode assembly laminate is visible from the bag opening. An organic solvent which can dissolve the binder of the positive electrode and/or the negative electrode is then poured into the electrode assembly in the jacket so that the electrode assembly is impregnated with the organic solvent.

For the jacket, materials listed in the paragraph of the jacket 6) can be used.

For the binder, materials listed in the paragraph of the positive electrode 1) can be used. Among them, PVdF is most preferable.

For the solvent, organic solvents having a boiling point of 200.degree. C. or less are preferable. When the boiling point is higher than 200.degree. C., vacuum drying of the electrode assembly to be mentioned below takes too long a time for a drying temperature of 100.degree. C. or less. The lowest boiling point of the organic solvent is preferably 50.degree. C. When the boiling point is lower than 50.degree. C., the organic solvent may evaporate while the solvent is being poured into the electrode assembly. The more preferable value of the highest boiling point is 180.degree. C. and that of the lowest boiling point is 100.degree. C.

Preferable examples of the organic solvent are dimethylformamide, dimethlacetamide, N-methylpyrrolidone, ethyl acetate, butyl acetate, methyl methacrylate, ethyl acrylate, trimethyl phosphate, acetone, methyl ethyl ketone, methyl isobutyl ketone, dimethylamine, triethylamine, tetrahydrofuran, ethyl ether, butyl ether, dioxane, ethylene oxide, cyclohexanone, acrylonitrile, acetonitrile, benzene, toluene, and xylene. Among them, dimethylformamide, dimethlacetamide, methyl ethyl ketone, acetone, and trimethyl phosphate are most preferable.

(The Third Step)

By drying the electrode assembly while pressing it to a predetermined thickness under atmospheric pressure or under a reduced pressure including vacuum, the organic solvent is vaporized, and the adhesion between the positive electrode layer and the separator and between the negative electrode layer and the separator is completed, thereby shaping and integrating the electrode assembly to a single body. The water included in the electrode assembly can be removed simultaneously, but inclusion of a small amount of organic solvent in the positive electrode layer, negative electrode layer, separator and adhesive layers is allowable.

The drying process is preferably performed at a temperature of 100.degree. C. or less for the following reason. When the drying temperature exceeds 100 .degree. C., the separator may shrink drastically by heat. A large thermal shrinkage may cause the warp of the separator, thereby making it difficult to maintain strong adhesion between the positive electrode, the negative electrode and the separator. Such thermal shrinkage tends to occur remarkably when porous films containing polyethylene or polypropylene are used as the separator. When the drying temperature is lowered, the thermal shrinkage of the separator is suppressed. However, when the drying temperature is set below 40.degree. C., the solvent may be vaporized only insufficiently. For this reason, the drying temperature should preferably be set in a range of 40 to 100.degree. C. Further, drying should preferably be conducted under a reduced pressure including vacuum.

(The Fourth Step)

A non-aqueous electrolyte solution is poured into the electrode assembly placed in the jacket, and the opening of the jacket is sealed off, thereby yielding a thin type non-aqueous electrolyte secondary battery.

For the non-aqueous electrolyte solution, materials listed in the paragraph of the non-aqueous electrolyte solution 4) can be used.

In the above-mentioned manufacturing process of the non-aqueous electrolyte secondary battery, a solvent which can dissolve the binder of the positive- and/or negative electrodes is poured into the electrode assembly after placing the electrode assembly in the jacket. However, the solvent may be poured into the electrode assembly without placing the electrode assembly in the jacket. In this case, an electrode assembly is prepared first by interposing a separator between a positive electrode and a negative electrode. The resultant electrode assembly is impregnated with one of the above-mentioned organic solvent, which is subsequently evaporated by drying the electrode assembly under atmospheric pressure or under a reduced pressure including vacuum, thereby forming adhesion layers on the interfaces between the positive electrode and the separator and between the negative electrode and the separator. The resultant electrode assembly is placed in a jacket and a non-aqueous electrolyte solution is poured into the electrolyte assembly in the jacket, and the opening of the jacket is sealed off, thereby yielding a thin type non-aqueous electrolyte secondary battery.

Using the manufacturing process according to the present invention, thin type non-aqueous electrolyte secondary batteries having a structure shown in FIGS. 1 and 2 or a structure shown in FIGS. 3 and 4 can be produced.

In the non-aqueous electrolyte secondary battery according to the present invention described in the above, a very small amount of the binder of the positive electrode and/or the negative electrode is dissolved by impregnating the electrode assembly with an organic solvent which is capable of dissolving the binder of the positive electrode and/or the negative electrode. The dissolved binder then permeates into the voids of the electrode assembly, particularly into the voids of the interfaces between the positive electrode layer and the separator and between the negative electrode layer and the separator, where the binder finally reprecipitates on drying. The reprecipitated binder functions as an adhesive layer which bonds the positive electrode layer and the separator together, and also as an adhesive layer which bonds the negative electrode layer and the separator together.

Since the amount of the binder which functions as adhesive layers is very small, the adhesive layers are thought to be extremely thin and existing homogeneously, or thought to be existing on part of the interfaces between the positive electrode layer and the separator and/or between the negative electrode layer and the separator. In any case, these adhesive layers integrate and fix the electrode assembly as if direct contact has been realized between the positive electrode and the separator and between the negative electrode and the separator.

As a result, not only the close contact of the positive- and negative electrodes and the separator is ensured even when a jacket made of a film is used, but also the increase of internal resistance originating from conductive polymer is suppressed, thereby making it possible to provide a non-aqueous electrolyte secondary battery in which capacity, large-current characteristics and cycle life are improved. Further, since it is possible to use a jacket made of a film, a non-aqueous electrolyte secondary battery having both a very small thickness, for example, of 4 mm or less and excellent properties in capacity, large-current characteristics and cycle life is realized.

In the above-mentioned drying process of the electrode assembly, the positive electrode and the separator are bonded together, and/or the negative electrode and the separator are bonded together, by drying the positive electrode, the separator and the negative electrode while applying pressure on the electrode assembly to keep close contact with each other. In this way, the electrode assembly can be integrated and fixed as if direct contact has been realized between the positive electrode and the separator and between the negative electrode and the separator. As a result, not only close contact of the positive- and negative electrodes and the separator is ensured even when a jacket made of a film is used but also the increase of internal resistance originating from a conductive polymer is suppressed, thereby making it possible to provide a thin type non-aqueous electrolyte secondary battery having improved capacity, large-current characteristics and cycle life.

Further, by performing the drying of the electrode assembly at temperatures between 40 and 100.degree. C., the thermal shrinkage of the separator, particularly the thermal shrinkage of the separator containing polyethylene or polypropylene, can be suppressed. Consequently, the bonding strength between the positive electrode, the negative electrode and the separator can be enhanced, thereby improving the large-current characteristics and cycle life of the above-mentioned secondary battery.

Further, since the above-mentioned binder of the positive- and/or negative electrode is made of at least one of fluoro rubber, polyvinylidene fluoride, polyacrylonitrile, polyvinyl chloride, ethylene-propylene-diene copolymer, and styrene-butadiene rubber, an electrode assembly having excellent bonding strength between the positive- and negative electrodes and the separator can be constructed, thereby improving the large-current characteristics and cycle life of the above-mentioned secondary battery.

When the organic solvent which can dissolve the binder of the positive- and/or negative electrode includes at least one of dimethylformamide, dimethlacetamide, N-methylpyrrolidone, ethyl acetate, butyl acetate, methyl methacrylate, ethyl acrylate, trimethyl phosphate, acetone, methyl ethyl ketone, methyl isobutyl ketone, dimethylamine, triethylamine, tetrahydrofuran, ethyl ether, butyl ether, dioxane, ethylene oxide, cyclohexanone, acrylonitrile, acetonitrile, benzene, toluene, and xylene, an appropriate amount of the binder of the positive- and/or negative electrodes dissolves in the organic solvent. Consequently, an electrode assembly having excellent bonding strength between the positive- and negative electrodes and the separator can be constructed, thereby improving the large-current characteristics and cycle life of the above-mentioned secondary battery.

Further, by selecting a separator material having a coefficient of thermal contraction at 120.degree. C. for one hour of 20% or less, the thermal shrinkage by drying at 100.degree. C. can be made smaller. Consequently, the bonding strength between the positive- and negative electrodes and the separator is further improved.

This invention will be further explained with reference to the following preferred examples as well as to drawings.

EXAMPLE 1

<Preparation of the Positive Electrode>

A mixture of 90 wt % lithium cobalt oxide (Li.sub.xCoO.sub.2, where 0.ltoreq.X.ltoreq.1) powder, 3.0 wt % acetylene black, 3.0 wt % graphite, and 4.0 wt % polyvinylidene fluoride (PVdF) powder was dispersed and mixed in N-methylpyrrolidone (NMP) to form a paste. The resultant paste was coated on both surfaces of a current collector made of a 15 .mu.m thick porous aluminum foil having 10 pores of 0.5 mm diameter per 10 cm.sup.2. The coated aluminum foil was then pressed, thereby obtaining a sheet of electrode having an electrode density of 3 g/cm.sup.3.

<Preparation of the Negative Electrode>

Mesophase pitch-based carbon fiber (MCF) which has been heat-treated at 3,000.degree. C. (fiber diameter 8 .mu.m, average fiber length 20 .mu.m, average lattice spacing (d.sub.002) 0.3360 nm) was selected as a carbonaceous material and PVdF was selected as a binder. A mixture of 93 wt % MCF and 7 wt % PVdF was dispersed and mixed in NMP. The resultant mixture was coated on both surfaces of a current collector made of a 15 .mu.m thick porous copper film having 10 pores of 0.5 mm diameter per 10 cm.sup.2, dried and pressed, thereby obtaining a sheet of electrode having an electrode density of 1.3 g/cm.sup.3.

<Separator>

Two identical, rectangular separator sheets made of a porous polyethylene film were prepared, each sheet having a thickness of 25 .mu.m, a coefficient of thermal contraction at 120.degree. C. for one hour of 20%, and a porosity of 50%. The length of the shorter sides of each separator sheet is greater than the corresponding shorter sides of the positive- and negative electrodes by 2 mm and 1.5 mm, respectively, and each separator is protruding from the longer sides of the positive- and negative electrodes by 1 mm and 0.75 mm, respectively.

<Preparation of the Non-aqueous Electrolyte Solution>

Lithium hexafluorophosphate (LiPF.sub.6) was dissolved in a solvent prepared by mixing ethylene carbonate (EC) and .gamma.-butyrolactone (BL) in a volume ratio of 1:2, thus obtain a 1 mol/l non-aqueous electrolyte solution.

<Preparation of the Electrode Assembly>

The obtained positive electrode, negative electrode and separators were laminated in the order of the separator, the positive electrode, the separator and the negative electrode, and the resultant laminate was wound up so that the first separator constitutes the outermost layer. The wound up body was then formed to a flat shape to obtain an electrode assembly as shown in FIG. 4. Prior to lamination, a positive electrode lead strip and a negative electrode lead strip were welded to the current collectors of the positive- and negative electrode current collectors, respectively.

A 100 .mu.m thick laminate film consisting of a sheet of aluminum foil and two polypropylene films covering both surfaces of the aluminum foil was formed into a bag, and the above-mentioned electrode assembly was placed in the bag so that the cross section of the electrode assembly laminate as shown in FIG. 4 was visible from the bag opening. Then methyl ethyl ketone (MEK), an organic solvent, was poured into the electrode assembly in the laminate film bag so that the amount of MEK was 0.25 g per 100 mAh of the battery capacity, thereby permeating MEK into the inside of the electrode assembly.

Then, the electrode assembly in the laminate film bag was vacuum-dried at 80.degree. C. for 12 hours to evaporate MEK while applying mechanical pressure on the laminate film bag. In this process, the positive electrode, the separator and the negative electrode of the electrode assembly were bonded with each other closely and firmly.

Then the above-mentioned non-aqueous electrolyte solution was poured into the electrode assembly in the laminate film bag so that the amount of the non-aqueous electrolyte solution was 4.1 g per 1 Ah of the battery capacity, thereby obtaining a thin type non-aqueous electrolyte secondary battery having a structure shown in FIGS. 1 and 2, a thickness of 3 mm, a width of 40 mm and a height of 70 mm.

EXAMPLE 2

A thin type non-aqueous electrolyte secondary battery was fabricated in the same manner as explained in Example 1 except that a paste prepared by dispersing and mixing 4 wt % styrene-butadiene rubber (SBR) and 96 wt % MCF in water was used as the binder of the negative electrode, and that acetone was used as an organic solvent in preparing the electrode assembly.

EXAMPLE 3

An electrode assembly fabricated in the same manner as described in EXAMPLE 1 was placed in a bag made of a laminate film so that the cross section of the electrode assembly laminate as shown in FIG. 4 was visible from the bag opening. Then dimethylformamide (DMF) was poured into the electrode assembly in the laminate film bag so that the amount of DMF per 100 mAh of the battery capacity was identical to that described in EXAMPLE 1, thereby permeating the DMF into the inside of the electrode assembly.

Then, the resultant electrode assembly in the laminate film bag was vacuum-dried at 40.degree. C. for 24 hours to evaporate DMF while applying mechanical pressure on the laminate film bag. In this process, the positive electrode, the separator and the negative electrode of the electrode assembly were bonded with each other closely and firmly.

A non-aqueous electrolyte solution identical to that of EXAMPLE 1 was then poured into the electrode assembly in the laminate film bag so that the amount of the non-aqueous electrolyte solution per 1 Ah of the battery capacity was identical to that of EXAMPLE 1. The thin type non-aqueous electrolyte secondary battery thus obtained had a structure shown in FIGS. 1 and 2, a thickness of 3 mm, a width of 40 mm and a height of 70 mm.

EXAMPLE 4

A thin type non-aqueous electrolyte secondary battery was fabricated in the same manner as explained in Example 3 except that drying in a vacuum was conducted at 80.degree. C. for 12 hours.

EXAMPLE 5

A thin type non-aqueous electrolyte secondary battery was fabricated in the same manner as explained in Example 3 except that drying in a vacuum was conducted at 100.degree. C. for 6 hours.

EXAMPLE 6

A thin type non-aqueous electrolyte secondary battery was fabricated in the same manner as explained in Example 4 except that aluminum was used as the negative electrode.

COMPARATIVE EXAMPLE 1

An electrode assembly fabricated in the same manner as described in EXAMPLE 1 was placed in a bag made of a laminate film so that the cross section of the electrode assembly laminate as shown in FIG. 4 was visible from the bag opening, and was dried at 80.degree. C. for 12 hours in a vacuum. Then a non-aqueous electrolyte solution identical to that of EXAMPLE 1 was poured into the electrode assembly in the laminate film bag so that the amount of the non-aqueous electrolyte solution per 1 Ah of the battery capacity was identical to that described in EXAMPLE 1, thereby obtaining a thin type non-aqueous electrolyte secondary battery having a structure shown in FIG. 1, a thickness of 3 mm, a width of 40 mm and a height of 70 mm.

COMPARATIVE EXAMPLE 2

A thin type non-aqueous electrolyte secondary battery was fabricated in the same manner as explained in Example 1 except that a separator made of a non-woven cloth impregnated with a gel electrolyte prepared by mixing polyacrylonitrile (PAN), $LiPF_6$, EC and MEC in a molar ratio of $PAN:LiPF_6:EC:MEC=16:5:55:24$ was employed and that the treatment by the organic solvent (MEK) described in EXAMPLE 1 was not conducted.

COMPARATIVE EXAMPLE 3

Polyvinylidene fluoride (PVdF) was dissolved in dimethylformamide, which is an organic solvent having a boiling point of 153.degree. C., to prepare a 3 wt % PVdF solution. The obtained solution was applied to both surfaces of a separator which was identical to that described in EXAMPLE 3. The resultant separator was interposed between a positive electrode and a negative electrode which are identical to those in EXAMPLE 1, thereby obtaining a laminate. The laminate was dried at 80.degree. C. for 12 hours in a vacuum to form adhesive layers between the positive electrode and the separator and between the negative electrode and the separator. The resultant laminate was wound spirally and formed to a flat shape to obtain an electrode assembly.

Subsequently, a non-aqueous electrolyte solution identical to that of EXAMPLE 1 was poured into the electrode assembly in the laminate film bag so that the amount of the non-aqueous electrolyte solution per 1 Ah of the battery capacity was identical to that described in EXAMPLE 1, thereby obtaining a thin type non-aqueous electrolyte secondary battery having a thickness of 3 mm, a width of 40 mm and a height of 70 mm.

The binders of the positive- and negative electrodes, the organic solvents, the drying temperature of the electrode assembly and the materials of the negative electrodes are summarized in TABLE 1.

The secondary batteries of EXAMPLES 1 to 5 and COMPARATIVE EXAMPLES 1 to 3 were subjected to a charge/discharge cycle test at 20.degree. C. wherein each cycle comprised 5 hour charging with a charging current of 300 mA to a voltage of 4.2 V and discharging at 300 mA to a voltage of 2.7 V. On the other hand, the secondary battery of EXAMPLE 6 was subjected to a charge/discharge cycle test at 20.degree. C., wherein each cycle comprised 5 hour charging with a charging current of 300 mA to a voltage of 4.0 V and discharging at 300 mA to a voltage of 2.7 V. The discharge capacity in the first cycle of each charge/discharge test (initial capacity) and the capacity maintenance relative to the initial capacity is shown in TABLE 2.

Further, the secondary batteries of EXAMPLES 1 to 5 and COMPARATIVE EXAMPLES 1 to 3 were charged for 5 hours with a charging current of 300 mA to a voltage of 4.2 V and then discharged at 2 C to a voltage of 2.7 V, and their discharge capacities were measured. The capacity maintenance relative to the initial capacity at a discharge rate of 2 C was calculated for these secondary batteries and is shown also in TABLE 2. On the other hand, the secondary battery of EXAMPLE 6 was charged for 5 hours with a charging current of 300 mA to a voltage of 4.0 V and then discharged at 2 C to a voltage of 2.7 V, and its discharge capacity was measured. The capacity maintenance ratio at a discharge rate of 2 C was calculated and is shown also in TABLE 2.

TABLE 1

| | Binder (Positive electrode) | Binder (Negative electrode) | Organic solvent | Drying temperature (.degree. C.) | Negative electrode |
|---|---|---|---|---|---|
| EXAMPLE 1 | PVdF | PVdF | MEK | 80 | Carbonaceous material |
| EXAMPLE 2 | PVdF | SBR | Acetone | 80 | Carbonaceous material |
| EXAMPLE 3 | PVdF | PVdF | DMF | 40 | Carbonaceous material |
| EXAMPLE 4 | PVdF | PVdF | DMF | 80 | Carbonaceous material |
| EXAMPLE 5 | PVdF | PVdF | DMF | 100 | Carbonaceous material |
| EXAMPLE 6 | PVdF | None | DMF | 80 | Aluminum |
| COMPARATIVE EXAMPLE 1 | PVdF | PVdF | None (*1) | 80 | Carbonaceous material |
| COMPARATIVE EXAMPLE 2 | PVdF | PVdF | None (*2) | — | Carbonaceous material |
| COMPARATIVE EXAMPLE 3 | PVdF | PVdF | None (*3) | — | Carbonaceous material |

(*1) The electrode assembly was not integrated; the electrode assembly was used as it is directly after winding.
(*1) The electrode assembly is not integrated. A polymer gel electrolyte was used in place of a non-aqueous electrolyte solution.
(*1) The electrode assembly was integrated not by dissolving the binder by an organic solvent, but by coating both surfaces of the separator with a binder solution.

TABLE 2

|  | Initial capacity (mAh) | Capacity maintenance after 300 cycles (%) | Capacity maintenance at 2 C discharge rate (%) |
|---|---|---|---|
| EXAMPLE 1 | 630 | 85 | 80 |
| EXAMPLE 2 | 650 | 85 | 80 |
| EXAMPLE 3 | 620 | 83 | 78 |
| EXAMPLE 4 | 640 | 85 | 80 |
| EXAMPLE 5 | 630 | 83 | 78 |
| EXAMPLE 6 | 550 | 75 | 70 |
| COMPARATIVE EXAMPLE 1 | 50 | 0 | 0 |
| COMPARATIVE EXAMPLE 2 | 400 | 70 | 40 |
| COMPARATIVE EXAMPLE 3 | 450 | 30 | 50 |

As shown in TABLES 1 and 2, the secondary batteries of EXAMPLES 1 to 6, which are equipped with an electrode assembly integrated by impregnation of an organic solvent which is capable of dissolving the binder and subsequent drying, have excellent initial capacity and cycle life. Further, the secondary batteries of EXAMPLES 1 to 6 have improved large-current discharge capacity at 2 C than the secondary batteries of COMPARATIVE EXAMPLES 1 to 3.

On the other hand, the secondary battery of COMPARATIVE EXAMPLE 1, which was fabricated without impregnating an organic solvent which was capable of dissolving the binder, has much inferior initial capacity, cycle life and large-current discharge capacity to those of the secondary batteries of EXAMPLES 1 to 6. Further, the secondary battery of COMPARATIVE EXAMPLE 2, which is provided with a gel electrolyte in place of a non-aqueous electrolyte solution, has smaller large-current discharge capacity at 2 C than the secondary batteries of EXAMPLES 1 to 6. Further, the secondary battery of COMPARATIVE EXAMPLE 3, which has an electrode assembly in which adhesive layers are provided between the positive electrode and the separator and between the negative electrode and the separator, has inferior initial capacity, cycle life and large-current discharge capacity to those of the secondary batteries of EXAMPLES 1 to 6.

As explained in the above, the present invention provides a non-aqueous electrolyte secondary battery which can be made thinner than 4 mm while maintaining improved discharge capacity, cycle life, and large-current discharge characteristics.

What is claimed is:

1. A method for manufacturing a non-aqueous electrolyte secondary battery including an electrode assembly that includes a separator between a positive electrode having a first binder material and a negative electrode having a second binder material comprising:

impregnating said electrode assembly with an organic solvent to dissolve at least one of said first and second binders;

drying said electrode assembly for bonding said positive electrode and said separator and for bonding said negative electrode and said separator together; and wherein the separator has a coefficient of thermal contraction at 120° C. for one hour of 20% or less.

2. A non-aqueous electrolyte secondary battery comprising:

a positive electrode including a first binder, a negative electrode including a second binder, a separator interposed between the positive electrode and the negative electrode, and a non-aqueous electrolyte solution, wherein a concentration of the sum of the first and second binders has a minimum in the separator and is smaller than the half of the maximum of the concentration at the interface between the separator and the positive electrode or the negative electrode.

* * * * *